Patented July 8, 1924.

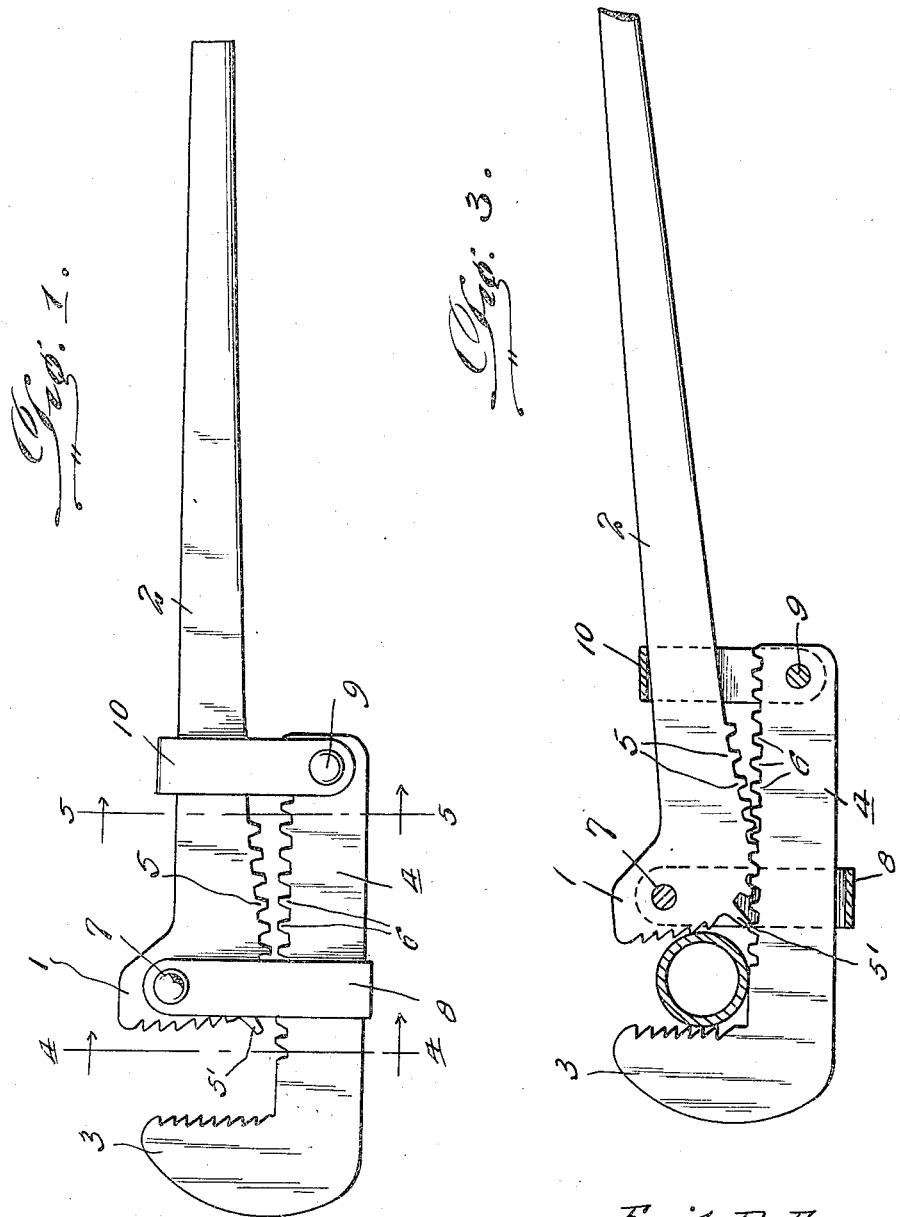

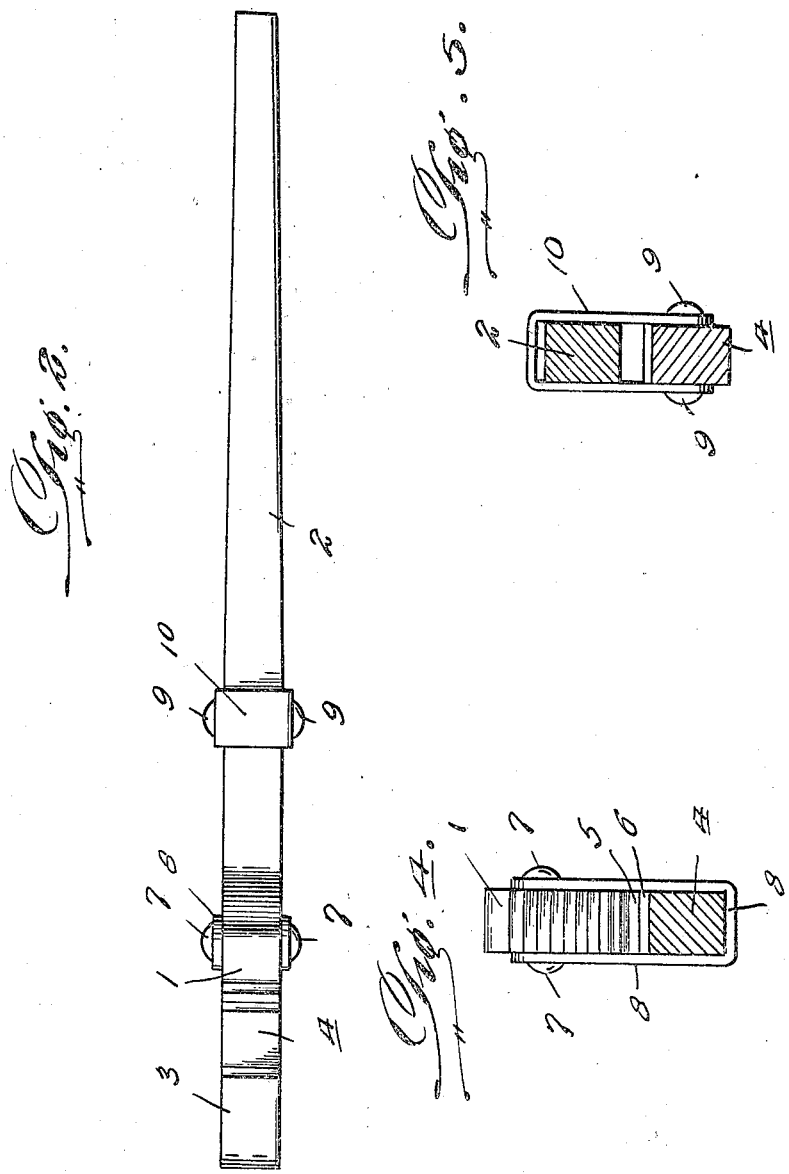

1,500,676

UNITED STATES PATENT OFFICE.

EMIL R. FRANK, OF SIOUX CITY, IOWA.

PIPE WRENCH.

Application filed January 6, 1923. Serial No. 611,000.

*To all whom it may concern:*

Be it known that I, EMIL R. FRANK, a citizen of the United States, residing at Sioux City, in the county of Woodbury and State of Iowa, have invented certain new and useful Improvements in Pipe Wrenches, of which the following is a specification.

This invention relates to improvements in pipe wrenches, and has for the primary object thereof, a provision of such a device that may be readily adjusted to accommodate pipes of different diameters and when once positioned upon the pipe, there will be no liability of the same slipping thereon.

A further object of the invention resides in the provision of such a device that is simple of construction and operation, comparatively inexpensive of manufacture, and highly useful of purpose.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevational view of a wrench constructed in accordance with the present invention, Figure 2 is a top plan view thereof, Figure 3 is a side elevational view, partly in section, showing the wrench in position upon a pipe, and Figures 4 and 5 are vertical cross sectional views upon the lines 4—4 and 5—5 respectively, of Figure 1, and looking in the direction of the arrows.

Referring to the drawings, the device includes an inner jaw 1 formed upon one end of a handle shank 2, an outer jaw 3 formed at right angles upon a longitudinally extending shank 4. The front of the handle shank 2 is toothed or racked upon its lower surface as at 5, and the adjacent upper surface of the longitudinal shank 4 of the jaw 3 is also toothed or racked as at 6 for intermeshing with the racked portion 5 of the handle shank 2. The toothed lower surface 5 of the handle shank is closed as clearly indicated in Figure 3 so that in the movement of the handle shank for tightening purposes, the inner jaw will have a limited relative movement toward the outer jaw after the same has been adjusted to a desired position with the teeth 5 intermeshing with the teeth 6.

Loosely engaging over the shank 4 and pivotally connected as at 7 to the jaw 1, is a substantially U-shaped strap member 8 and pivotally connected to the rear end of the shank 4 as at 9 is an inverted substantially U-shaped strap member 10, engaging loosely over the handle 2 of the body 1.

The foremost one as 5' of the teeth 5 is enlarged with respect to the other teeth, and is so spaced from the adjacent tooth as to contact with the upper edge of one of the teeth of the racked surface 6 of the longitudinal shank 4 of the jaw 3 in a manner hereinafter described.

The length of the U straps 8 and 10, is such as to allow a relative movement of the handle shank 2 towards and away from the longitudinally extending shank 4 of the jaw 3, so that when the tool is positioned as shown in Figure 1, the jaws 1 and 3 may be moved towards or away from each other for fitting over pipes of different diameters. When the pipe is positioned within the jaws shown in Figure 3, a pivotal movement of the jaw 1 upon its pivot 7 will cause this jaw to wedge upon the pipe as shown, and in view of the relative large tooth 5' of the racked surface 5, it will be seen that the inward pivotal movement of the jaw 1 with respect to the jaw 3 will be limited so as to prevent any crushing of the pipe between the jaws. The strap 10 merely serves as a means for preventing total disengagement of the jaws from each other.

In view of the above description, it is believed by me that the advantages and operation of the present device will be readily appreciated by those skilled in the art, and while I have herein shown and described the preferred embodiment of the present invention, it is nevertheless to be understood that minor changes may be made therein without departing from the spirit and scope of the invention as claimed.

What I claim as new is:—

1. In a wrench of the class described including an inner and an outer jaw member, each having a longitudinally extending shank formed thereon, a strap connection between the inner jaw and the shank of the outer jaw, said strap being pivotally secured to the inner jaw, and loosely engaging over the shank of the outer jaw for permitting of a relative sliding movement between the jaws, and also permitting of a swinging movement of the inner jaw with respect to the outer jaw, teeth formed upon the adjacent surfaces of the shanks of the jaws adapted for inter-meshing when the inner jaw is swung upon its pivot, and means for limiting the swinging movement of the inner jaw with respect to the outer jaw whereby the relative swinging movement between the jaw members provides for increased gripping action of the jaws on the work in use.

2. In a wrench of the class described, including an outer and an inner jaw member, loose connections between the jaw members for permitting of a sliding movement therebetween, and for also permitting of a swinging movement of the inner jaw with respect to the outer jaw after adjustment relative to a piece of work, and means for limiting the swinging movement of the inner jaw with respect to the outer jaw whereby the relative swinging movement between the jaw members provides for increased gripping action of the jaws on the work in use.

3. A wrench including an inner jaw member and an outer jaw member, the inner jaw member having a longitudinally extending shank formed thereon, a strap connection between the inner jaw and the shank of the outer jaw, said strap being pivotally secured to the inner jaw, and loosely engaging over the shank of the outer jaw for permitting a relative sliding movement between the jaws, and also permitting of a swinging movement of the inner jaw with respect to the outer jaw, teeth formed upon the adjacent surfaces of the shanks of the jaws, the teeth on the inner jaw being formed on a curved surface and adapted for intermeshing with the teeth on the outer jaw, and means for limiting the swinging movement of the inner jaw with respect to the outer jaw whereby the inner jaw is slidable relative to the outer jaw to position said jaws relative to each other for engagement with the work, and a swinging movement of the inner jaw being adapted to provide further relative movement between the jaws to permit a gripping action of the wrench with the work while said limiting means prevents damage to the work.

In testimony whereof I affix my signature.

EMIL R. FRANK.